US011894639B2

(12) United States Patent
Tsuchiya et al.

(10) Patent No.: US 11,894,639 B2

(45) Date of Patent: Feb. 6, 2024

(54) COAXIAL CONNECTOR

(71) Applicant: SMK Corporation, Tokyo (JP)

(72) Inventors: Hirotaka Tsuchiya, Tokyo (JP); Fumio Osawa, Tokyo (JP); Tadahito Sasaki, Kanagawa (JP); Tsubasa Kanatani, Tokyo (JP)

(73) Assignee: SMK Corporation, Tokyo (JP)

( * ) Notice: Subject to any disclaimer, the term of this patent is extended or adjusted under 35 U.S.C. 154(b) by 120 days.

(21) Appl. No.: 17/721,351

(22) Filed: Apr. 14, 2022

(65) Prior Publication Data

US 2023/0025860 A1 Jan. 26, 2023

(30) Foreign Application Priority Data

Jul. 21, 2021 (JP) ................................ 2021-120395

(51) Int. Cl.
*H01R 24/42* (2011.01)
*H01R 13/631* (2006.01)
*H01R 13/516* (2006.01)

(52) U.S. Cl.
CPC ........... *H01R 24/42* (2013.01); *H01R 13/516* (2013.01); *H01R 13/6315* (2013.01)

(58) Field of Classification Search
CPC ... H01R 13/516; H01R 13/6315; H01R 24/42
USPC ........................................ 439/246, 247, 578
See application file for complete search history.

(56) References Cited

U.S. PATENT DOCUMENTS

| | | | | | |
|---|---|---|---|---|---|
| 3,870,978 | A * | 3/1975 | Dreyer | H01R 24/42 | 439/933 |
| 5,221,216 | A * | 6/1993 | Gabany | H01R 24/50 | 333/185 |
| 5,329,262 | A * | 7/1994 | Fisher, Jr. | H01R 24/44 | 333/260 |
| 5,516,303 | A * | 5/1996 | Yohn | H01R 13/6315 | 439/248 |
| 6,699,054 | B1 * | 3/2004 | Critelli | H01R 24/50 | 439/63 |
| 8,002,574 | B1 * | 8/2011 | Yi | H01R 13/582 | 439/455 |
| 9,905,968 | B2 * | 2/2018 | Yanase | H01R 13/6315 | |

(Continued)

FOREIGN PATENT DOCUMENTS

| | | | |
|---|---|---|---|
| DE | 102017009066 | A1 | 3/2019 |
| JP | 2006059691 | A | 3/2006 |

OTHER PUBLICATIONS

Extended European Search Report for counterpart European Application No. 22171410.8, issued by the European Patent Office dated Oct. 19, 2022.

*Primary Examiner* — Marcus E Harcum

(57) ABSTRACT

There is provided a coaxial connector that can suitably bias a movable insulator to the side of a socket and maintain matched impedance. The coaxial connector includes a movable insulator that is fitted in a central conductor so as to be slidable and is housed in an insulator housing so as to be movable in an axial direction; and a biasing rubber member that is interposed between a partition disposed in the recesses of the insulator housing and the movable insulator. When the biasing rubber member connects the socket to the plug, the movable insulator is pushed in by a pushing force from a socket, and elastic pillars are bent in an arc shape.

5 Claims, 11 Drawing Sheets

(56) References Cited

U.S. PATENT DOCUMENTS

| | | | | |
|---|---|---|---|---|
| 2013/0115809 | A1* | 5/2013 | Hanson | H01R 13/6591<br>439/578 |
| 2015/0011120 | A1* | 1/2015 | Goebel | H01R 4/48<br>439/578 |
| 2015/0038009 | A1* | 2/2015 | Gibson | H01R 13/08<br>439/578 |
| 2021/0313746 | A1* | 10/2021 | Kato | H01R 13/6215 |
| 2021/0399468 | A1* | 12/2021 | Gingrich, III | H01R 13/426 |

* cited by examiner

COAXIAL CONNECTOR

The contents of the following Japanese patent application (s) are incorporated herein by reference:

NO. 2021-120395 filed on Jul. 21, 2021.

FIELD

The present invention relates to a coaxial connector for connecting an electronic component, which is housed in a case for a camera module or the like, to a cable such as a coaxial cable.

BACKGROUND

Modules such as camera modules for in-vehicle cameras have a module body housed in a case. The module body is connected to a coaxial cable via a coaxial connector attached to the case.

This coaxial connector includes a socket connected to a board that constitutes the module body housed in the case, and a plug connected to the coaxial cable. The plug and socket are connected by attaching the plug to the case or by assembling a rear case, to which the plug is attached, to a front case.

The plug includes a cylindrical shell made of a conductive metal material, an insulator that is made of an insulating resin and housed in the shell, and a central conductor that is made of a conductive metal material and held in the insulator. An insulator housing in which the socket is to be fitted is formed at one end of the shell.

The insulator is located in the axial recesses of the insulator housing, which is open on an axial end face of the shell, and forms a recessed inner wall of the insulator housing. A tip of the central conductor protrudes from the axial end face of the shell. By fitting the socket in the insulator housing, the shell is brought into contact with an outer conductor of the socket, and the central conductor is also brought into contact with a central conductor of the socket.

On the other hand, when the plug and the socket are connected, the relative position between the plug and the socket to be connected may deviate from a designed value in an axial direction, owing to the position of the board housed in the case, mounting tolerance between the plug and the case, or the like. Even in such a case, a secure connection must be made.

Therefore, a margin of a predetermined distance is provided in the insulator housing in the axial direction (connection direction) in order to absorb the positional deviation. This allows an error from the designed value in the axial direction, so that the connection between the plug and the socket is always maintained.

However, in a case in which the insulator housing is provided with the margin of the predetermined distance in the axial direction (connection direction), as described above, if the relative position between the plug and the socket is farther than the designed value, an air layer with a dielectric constant lower than that of the resin occurs between an axial end face of the insulator and an end face of the socket, which may cause change in matched impedance.

Therefore, for this type of coaxial connectors, coaxial connectors are developed which include a movable insulator housed so as to be slidable in the insulator housing and a metal elastic member, such as a coil spring or a leaf spring, which is interposed between the movable insulator and a fixed insulator held in the shell or between the movable insulator and an inner wall of the shell and which biases the movable insulator to the side of the socket, so as to make an end face of the movable insulator always in contact with the end face of the socket. (See, for example, Patent Literature 1).

CITATION LIST

Patent Literature

Patent Literature 1: Japanese Patent Application Laid-Open No. 2006-059691

SUMMARY

Technical Problem

However, in the technology as described above, the placement of the metal elastic member, such as the coil spring or the leaf spring, around the central conductor could interfere with impedance matching.

In view of these conventional problems, an object of the present invention is to provide a coaxial connector that can suitably bias a movable insulator to the side of a socket and maintain matched impedance.

Solution to Problem

To solve the above-described conventional problems, a first aspect of the present invention is a coaxial connector, the coaxial connector including a plug in which a socket is fitted at one end. The plug includes: a shell that is made of a conductive material and has an insulator housing open to the one end; an outer conductor that is made of a conductive material and is held inside the insulator housing; a central conductor that is made of a conductive material and is located inside the shell; a movable insulator that is fitted in the central conductor so as to be slidable and is housed in the insulator housing so as to be movable in an axial direction; and a biasing rubber member that is interposed between a partition disposed in the recesses of the insulator housing and the movable insulator or between a fixed insulator fixed in the shell and the movable insulator. The biasing rubber member includes: a pair of bearing plates that are opposite to each other with a space in between; and a plurality of elastic pillars that connect between both the bearing plates. When the socket is connected to the plug, the movable insulator is pushed in by a pushing force from the socket, so that the elastic pillars are bent in an arc shape.

In a second aspect of the present invention, in addition to the configuration of the first aspect, the movable insulator includes, on an outer face, a guide groove into which a guide protrusion protruding to an inner face of the insulator housing is inserted. The movable insulator slides in the insulator housing in the axial direction by being guided by the guide protrusion. The biasing rubber member includes, along side edges of the bearing plates, guide recesses into which the guide protrusion is inserted. The elastic pillars are arranged on the side edges of the guide recesses in such a manner that a side toward the center of the curvature faces the guide protrusion.

In a third aspect of the invention, in addition to the configuration according to the first or second aspect, the elastic pillars each include a plate-shaped pillar body disposed on the side toward the center of the curvature, and a reinforcing protrusion protruding outside the pillar body relative to the curvature.

In a fourth aspect of the present invention, in addition to the configuration of the third aspect, the width of the pillar body is twice or more the width of the reinforcing protrusion in a protruding direction.

In a fifth aspect of the present invention, in addition to the configuration of any one of the first to fourth aspects, the movable insulator is formed with a conductor insertion hole into which the central conductor is inserted, and a slide hole which is communicated with the conductor insertion hole and into which the fixed insulator fixed in the shell is inserted so as to be slidable.

The coaxial connector according to the aspect(s) of the present invention, by having the configuration of the first aspect, can suitably bias the movable insulator to the side of the socket without forming an air layer between the movable insulator and the socket. In addition, no metal material is placed around the central conductor, thus allowing matched impedance to be maintained.

Also, in the aspect(s) of the present invention, by having the configuration of the second aspect, the curvature of the elastic pillars can be suitably controlled, which allows a stable floating state to be maintained.

Furthermore, in the aspect(s) of the present invention, by having the configuration of the third and fourth aspects, a constant biasing force can be exerted and the curvature can be suitably controlled.

Furthermore, in the aspect(s) of the present invention, by having the configuration of the fifth aspect, the central conductor is covered with a resin material, thus allowing impedance matching to be maintained.

DESCRIPTION OF EMBODIMENTS

Figure 1:
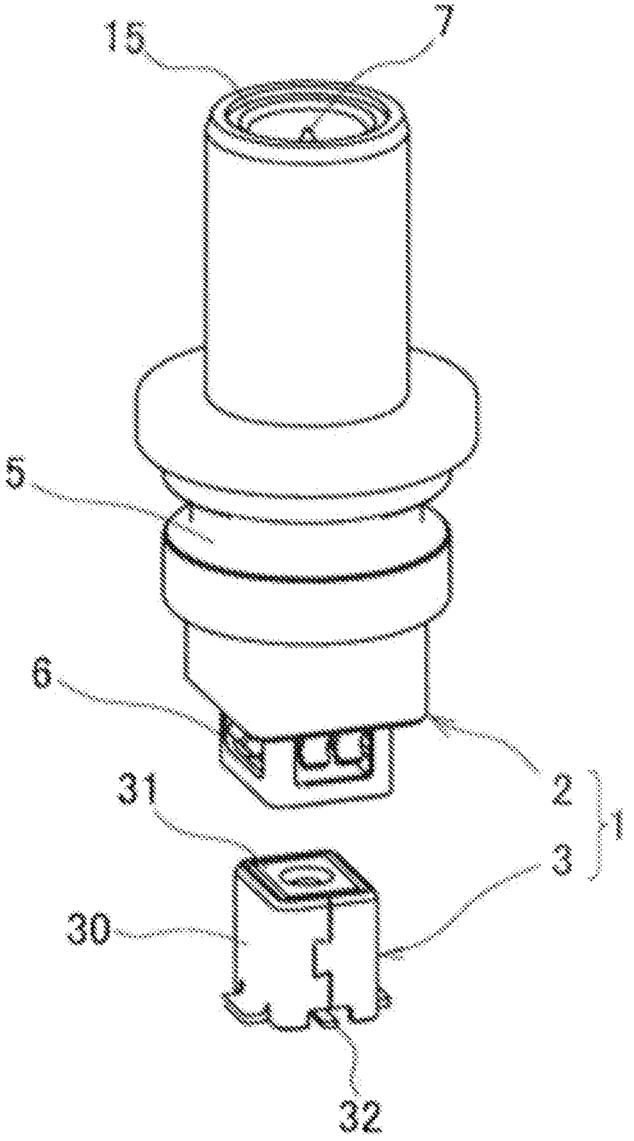
FIG. 1 is an exploded perspective view illustrating an example of a coaxial connector with a floating mechanism according to the present invention.

Next, an embodiment of a coaxial connector with a floating mechanism according to the present invention will be described on the basis of an example illustrated in FIGS. 1 to 8B. In the drawings, the reference numeral 1 indicates the coaxial connector with a floating mechanism.

In the coaxial connector with a floating mechanism (hereinafter referred to as coaxial connector) 1, as illustrated in FIG. 1, a socket 3 is fitted in one end of a plug 2 connected to a coaxial cable or the like, so that the plug 2 and the socket 3 are electrically connected to each other.

Figure 2:
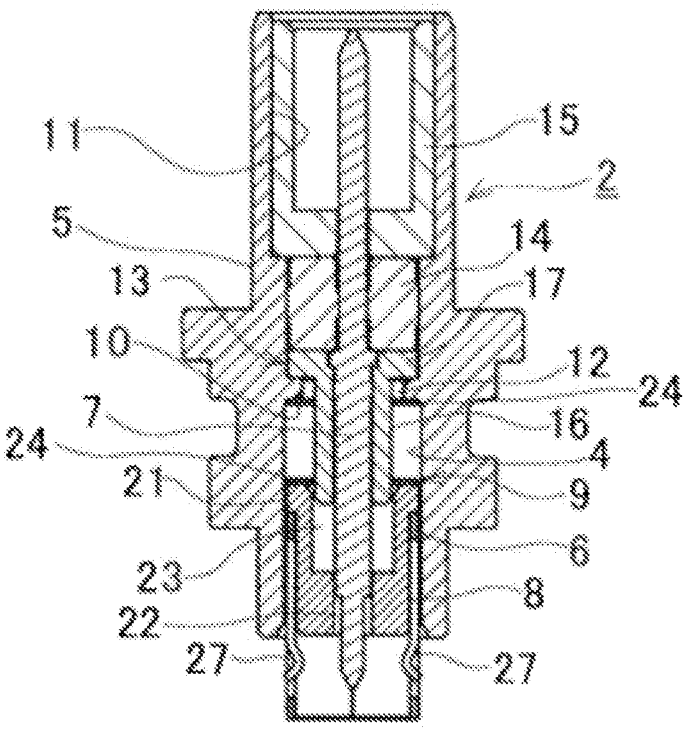
FIG. 2 is a longitudinal sectional view illustrating a plug of the coaxial connector.
Figure 3:
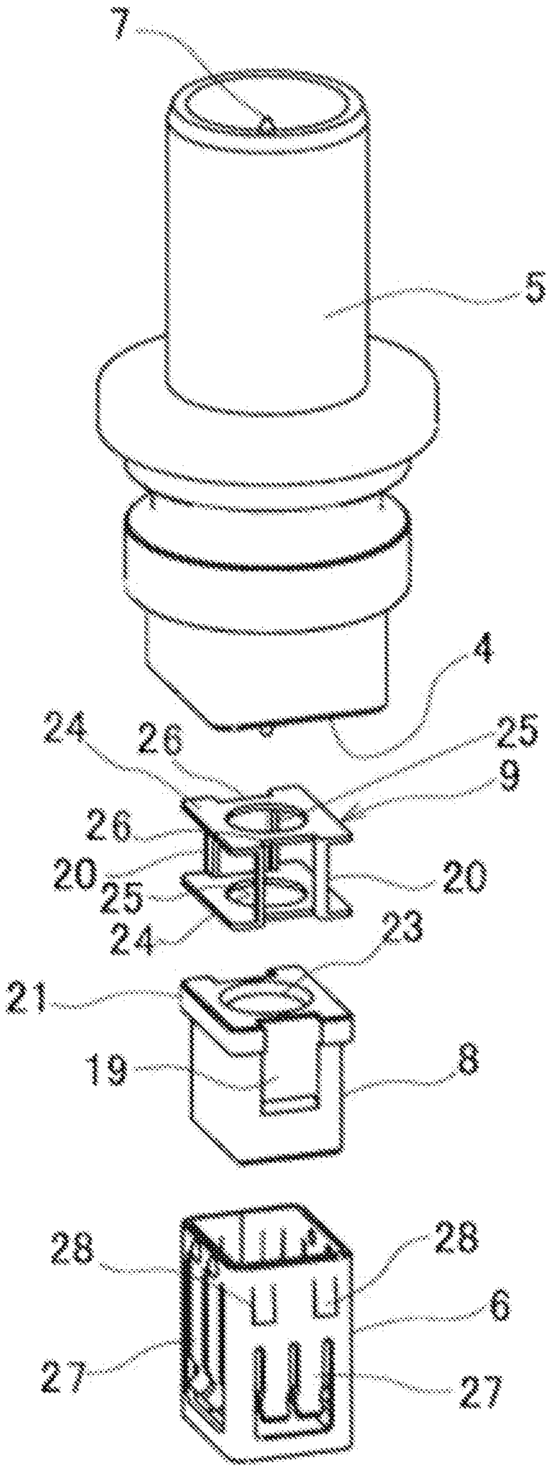
FIG. 3 is a partly exploded perspective view illustrating the plug of the coaxial connector.

As illustrated in FIGS. 2 and 3, the plug 2 includes a shell 5 containing an insulator housing 4 that is open at one end, an external conductor 6 held inside the insulator housing 4, a central conductor 7 disposed inside the shell 5, a movable insulator 8 housed in the insulator housing 4 as to be movable in an axial direction, and a biasing rubber member 9 that biases the movable insulator 8 towards the socket 3.

Figure 4A:
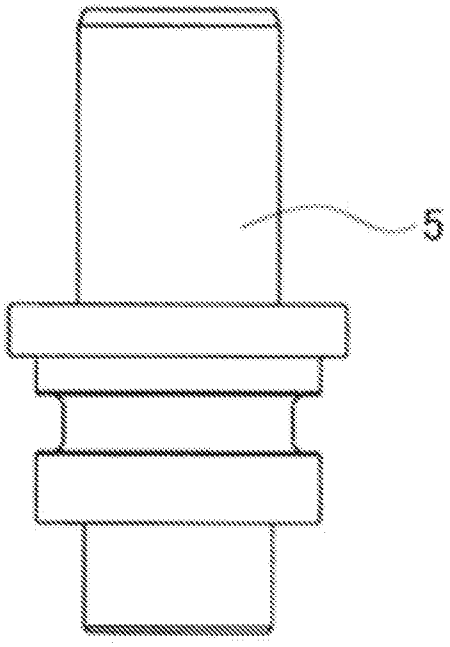
FIG. 4A is a front view illustrating a shell of the coaxial connector.
Figure 4B:
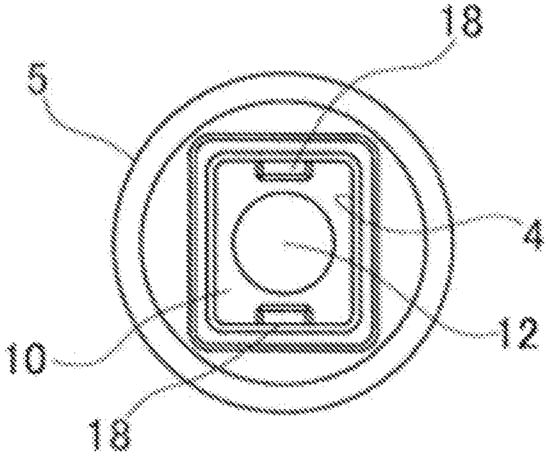
FIG. 4B is a bottom view of the shell.
Figure 4C:
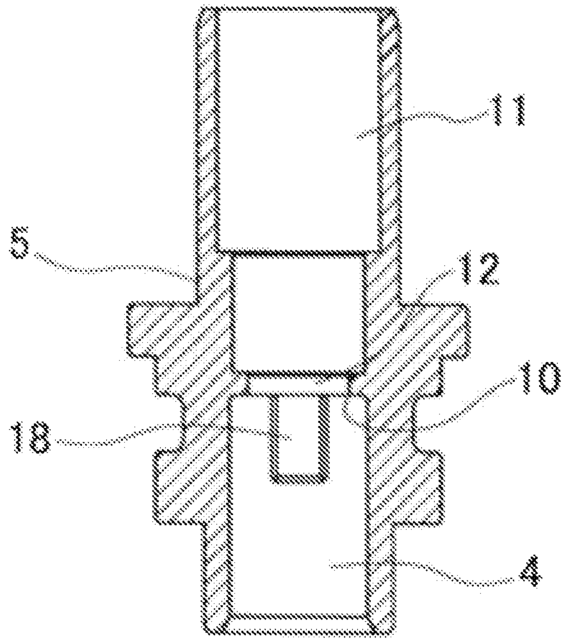
FIG. 4C is a longitudinal sectional view of the shell.

As illustrated in FIGS. 4A to 4C, the shell 5 is formed of a conductive metal material in a deformed cylindrical shape as a single body. The shell 5 has a round-hole-shaped cable connection part 11 and the rectangle-hole-shaped insulator housing 4 that are formed continuously in the axial direction through a partition 10.

The partition 10 is formed in the shape of a plate orthogonal to the axial direction, and has a round-hole-shaped insulator insertion hole 12 formed in the center.

In the cable connection part 11, a fixed insulator 13 holding the pin-shaped central conductor 7 made of a conductive metal material, a cylindrical intermediate rubber member 14, and a bottomed cylindrical-shaped cable-side insulator 15 made of an insulating resin are sequentially fitted. The fixed insulator 13, the intermediate rubber member 14, and the cable-side insulator 15 hold the central conductor 7 concentrically at the center of the shell 5.

The fixed insulator 13 is formed of an insulating resin as a single body. The fixed insulator 13 includes a cylindrical protrusion 16 and a flange 17 protruding from one end of the protrusion 16. The protrusion 16 protrudes to the insulator housing 4 through the insulator insertion hole 12 of the partition 10. The flange 17 is configured to be in contact with the partition 10.

In the fixed insulator 13, the central conductor 7 is held in a penetration state. The flange 17 is pressed by the intermediate rubber member 14 and the cable-side insulator 15 to the side of the partition 10, and is then fixed in the shell 5 in a non-movable manner.

The insulator housing 4 is formed in the shape of a rectangular hole with a recessed side closed by the partition 10 and the other end open. As illustrated in FIG. 3, the biasing rubber member 9 and the movable insulator 8 are housed in the insulator housing 4 from the side of the opening, and the external conductor 6 is fitted in and connected to the opening.

Guide protrusions 18, 18 protrude on a pair of inner surfaces of the insulator housing 4 that are opposite to each other. The movable insulator 8 can slide in the insulator housing 4 in the axial direction by being guided by both the guide protrusions 18, 18.

The guide protrusions 18, 18 are formed in a rectangular parallelepiped shape long in the axial direction, with flat side faces 18*a*, 18*a* on both sides. The guide protrusions 18, 18 are inserted into guide grooves 19, 19 formed on side faces of the movable insulator 8 to guide the movable insulator 8 in the axial direction.

The guide protrusions 18, 18 are formed to be longer at least than the height of the biasing rubber member 9 in the axial direction, and have the side faces 18*a*, 18*a* that are always positioned on a side A which is a side toward the center of the curvature of elastic pillars 20, 20 . . . , which will be described later.

Note that, the curvature refers to a direction to which, with respect to each elastic pillar 20, the elastic pillar 20 is bent into an arc shape and expands under an axial compression force. The side toward the center of the curvature refers to a side with the center of the expanding arc (a side indicated by arrows A in FIGS. 6B, 8A and 8B). An outside of the curvature refers to a side of expansion of the expanding arc (sides indicated by arrows B in FIGS. 6B, 8A and 8B).

Figure 5A:
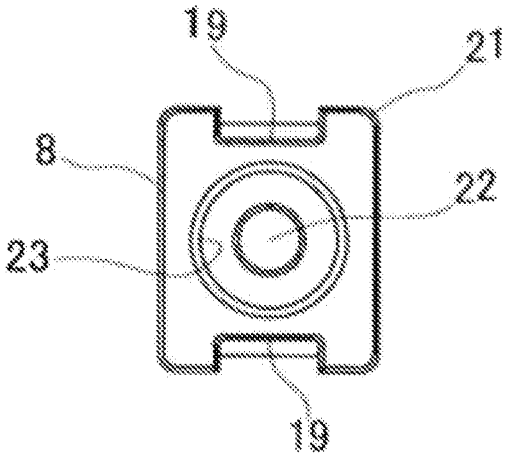
FIG. 5A is an enlarged plan view illustrating a movable insulator of the coaxial connector.
Figure 5B:
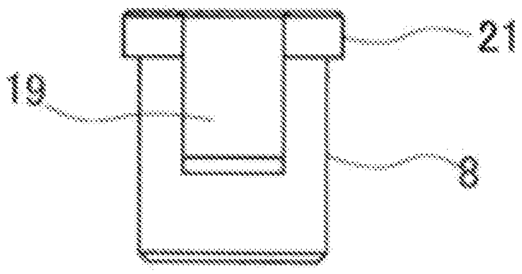
FIG. 5B is an enlarged front view of the movable insulator.
Figure 5C:
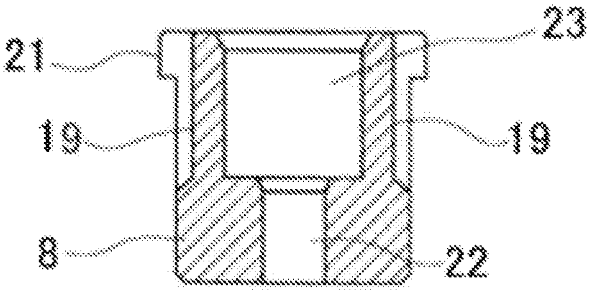
FIG. 5C is an enlarged longitudinal sectional view of the movable insulator.

As illustrated in FIGS. 5A to 5C, the movable insulator 8 is formed of an insulating resin in a rectangular parallelepiped shape, and has an outwardly protruding flange 21 at one end (on the side of the partition 10). The movable insulator 8 is inserted into the external conductor 6 so as to be slidable, and the flange 21 prevents the movable insulator 8 from slipping out of the outer conductor 6.

In this movable insulator 8, a conductor insertion hole 22 through which the central conductor 7 is inserted is formed by penetrating the center, and a slide hole 23 is formed on the side of the partition 10 relative to the conductor insertion hole 22. The protrusion 16 of the fixed insulator 13, which protrudes from the partition 10 into the insulator housing 4, is inserted into the slide hole 23 so as to be slidable. The movable insulator 8 is fitted in the central conductor 7 in the axial direction so as to be slidable.

The axially long guide grooves 19, 19 matched with the guide protrusions 18, 18 are formed on side faces of the movable insulator 8. The movable insulator 8 can move in the axial direction in the insulator housing 4 along the guide protrusions 18, 18 inserted into the guide grooves 19, 19.

Figure 6A:
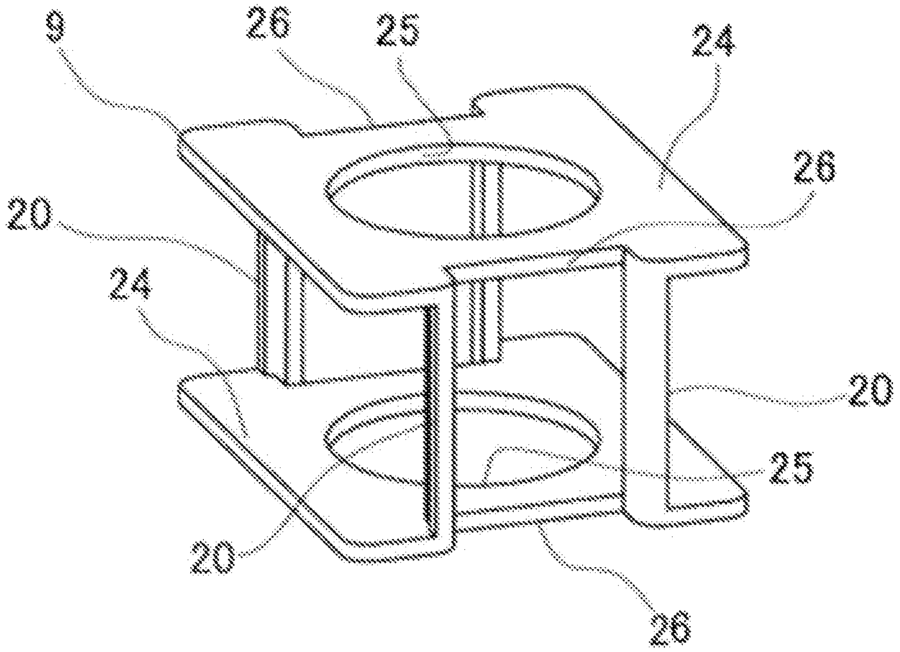
FIG. 6A is an enlarged perspective view illustrating a biasing rubber member of the coaxial connector.
Figure 6B:
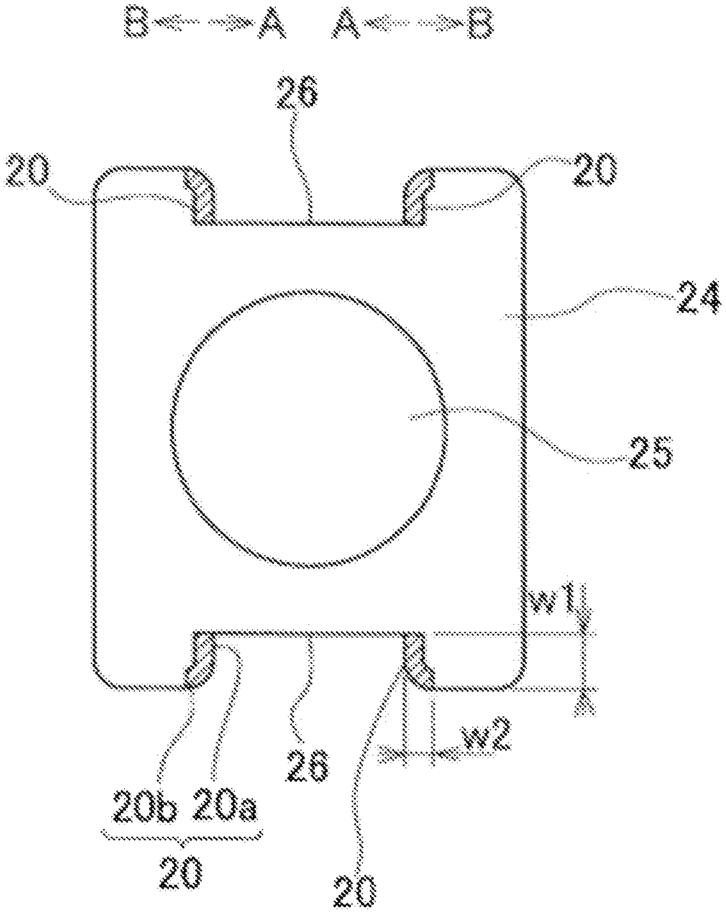
FIG. 6B is an enlarged transverse sectional view illustrating the biasing rubber member.

As illustrated in FIGS. 6A and 6B, the biasing rubber member 9 is formed of an elastic rubber material as a single body. The biasing rubber member 9 includes a pair of rectangular bearing plates 24, 24 that are opposite to each other in the axial direction separated by a predetermined distance, and the plurality of elastic pillars 20, 20 . . . that connect the bearing plates 24, 24. The bearing plates 24 are made to be in contact with the partition 10 and an end face of the movable insulator 8, respectively. The biasing rubber member 9 biases the movable insulator 8 to the side of the socket 3 by exerting a reaction force on the partition 10.

The bearing plates 24, 24 are formed in the shape of a rectangular plate that matches with the shape of the cross section of the insulator housing 4. The bearing plates 24, 24 each have an insulator through hole 25 in the center through which the protrusion 16 of the fixed insulator 13 is inserted, and are made to be in surface contact with the partition 10 and the end face of the movable insulator 8, respectively.

Along the side edges of the bearing plates 24, 24, guide recesses 26, 26 through which the guide protrusions 18, 18 are inserted are formed. Both the bearing plates 24, 24 are guided by the guide protrusions 18, 18 so as to be movable relative to each other in the axial direction.

The elastic pillars 20, 20 . . . each include a plate-shaped pillar body 20*a* that is disposed on the side A toward the center of the curvature and is long in the connection direction of the bearing plates 24, 24, and a reinforcing protrusion 20*b* that protrudes outside the pillar body 20*a* relative to curvature. The pillar body 20*a* and the reinforcing protrusion 20*b* are formed into a pillar shape continuous in the connection direction of the bearing plates 24, 24, with the shape of the letter L or T as the cross section.

Each of the elastic pillars 20, 20 . . . is arranged in such a manner that a surface of the pillar body 20*a* (a surface on the opposite side of the reinforcing protrusion 20*b*) is coplanar to an inner face of the guide recess 26. The elastic pillars 20, 20 connect between the side edges of the guide recesses 26, 26 of both the bearing plates 24, 24 in such a manner that the side A toward the center of the curvature faces the guide protrusions 18, 18.

Note that, since the elastic pillars 20, 20 . . . are arranged on the side edges of the guide recesses 26, 26, the guide protrusions 18, 18 are always arranged on the side A toward the center of the curvature. Thus, each of the elastic pillars 20, 20 . . . is prevented from being bent to the side of the guide protrusions 18, 18, and is bent smoothly in an arc shape with the side of the reinforcing protrusion 20*b* being directed to the outside B of the curvature.

Note that, in order to obtain smooth bending and a predetermined reaction force, it is desirable that the width w1 of the pillar body 20*a* be twice or more the width w2 of the reinforcing protrusion 20*b* in a protruding direction.

The external conductor 6 is formed into a rectangular cylindrical shape by punching and bending a conductive plate material. On the side faces of the external conductor 6, leaf spring-shaped contacts 27, 27 . . . for establishing connection to an external conductor 31 of the socket 3 are formed by lancing.

The external conductor 6 has outwardly protruding engagement pieces 28, 28 formed on outer faces at one end. The external conductor 6 is fixed and connected to the inside of the insulator housing 4 by engagement of the engagement pieces 28, 28 with inner faces of the insulator housing 4. The movable insulator 8 is inserted into the inside of the external conductor 6 so as to be movable, and the flange 21 comes into contact with the external conductor 6 to prevent the movable insulator 8 from slipping out of the external conductor 6.

In this coaxial connector 1, when the socket 3 is fitted in the external conductor 6, the socket 3 pushes the movable insulator 8 to the recesses, and the contacts 27, 27 . . . of the external conductor 6 come into contact with the socket external conductor 30. A tip of the central conductor 7 is inserted into a socket housing 31 and comes into contact with a socket contact 32 to establish an electric connection.

When the movable insulator 8 is pushed to the recesses further, the bearing plate 24 on the side of the movable insulator 8 is pressed against the bearing plate 24 that is in contact with the partition 10, and the elastic pillars 20, 20 . . . , which connect between both the bearing plates 24, are bent in an arc shape. Thereby, the biasing rubber member 9 biases the movable insulator 8 to the side of the socket 3 by exerting a reaction force on the partition 10.

Therefore, even in a case in which the relative position between the plug 2 and the socket 3 to be connected deviates from a designed value in the axial direction, owing to the position of a board housed in the case, mounting tolerance between the plug 2 and the case, or the like, a tip end face of the movable insulator 8 always remains in contact with a connection end face of the socket 3 without the occurrence of a gap (air layer) between the movable insulator 8 and the socket 3, thus allowing impedance matching to be maintained.

Figure 7A:
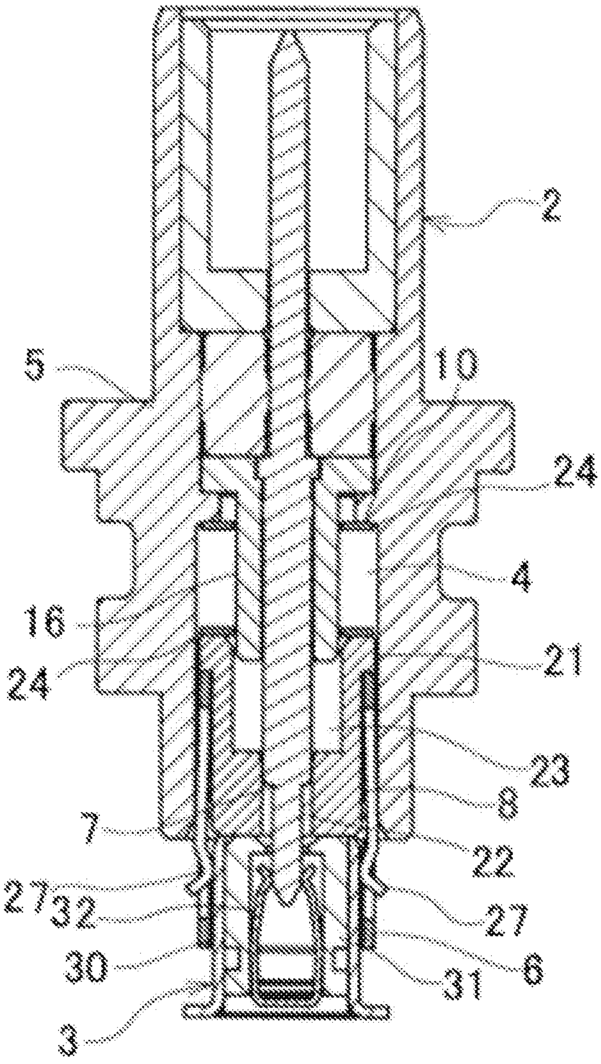
FIG. 7A is a longitudinal sectional view illustrating the operation of the coaxial connector with a floating mechanism in which the distance between a plug and a socket is long.
Figure 7B:
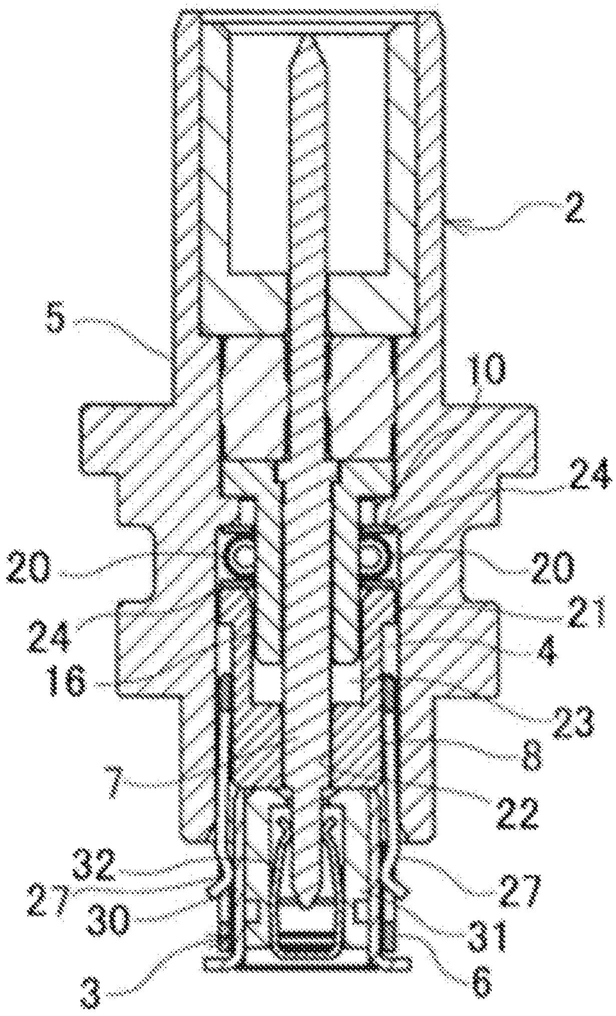
FIG. 7B is a longitudinal sectional view illustrating the operation of the coaxial connector with a floating mechanism in which the distance between the plug and the socket is short.

Specifically, in a case in which the distance between the plug 2 and the socket 3 is larger than a designed value, the movable insulator 8 is pushed to the side of the socket 3 until the elastic pillars 20, 20 . . . are extended as illustrated in FIG. 7A. In a case in which the distance between the plug 2 and the socket 3 is lesser than the designed value, the elastic pillars 20, 20 . . . are bent, and by the reaction force exerted thereby, the movable insulator 8 is pushed to the side of the socket 3, as illustrated in FIG. 7B.

In this case, the bearing plates 24, 24 of the biasing rubber member 9 are formed in the shape of plates and thus are in surface contact with the partition 10 and the end face of the movable insulator 8, respectively, so that the compression force associated with the pushing of the movable insulator 8 is evenly distributed to the individual elastic pillars 20, 20 . . . and the elastic pillars 20, 20 . . . are suitably bent.

Figure 8A:
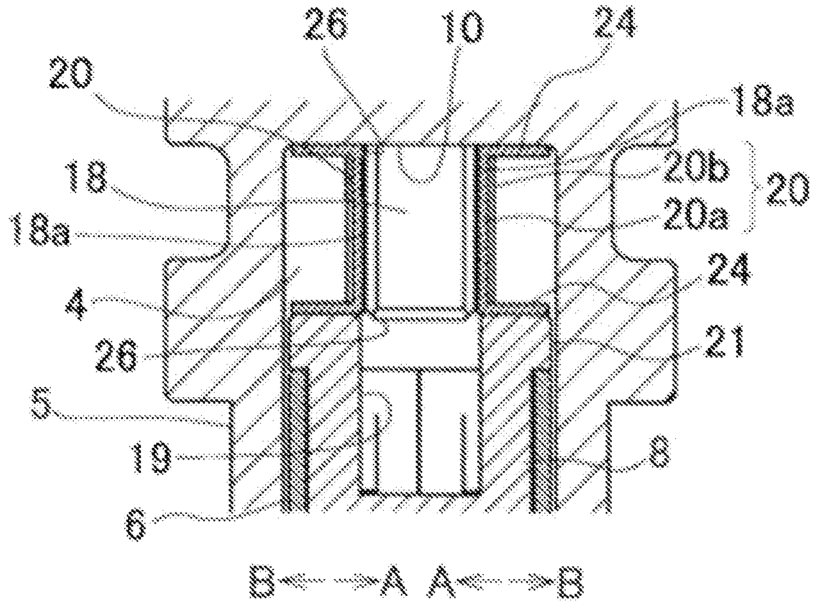
FIG. 8A is an enlarged sectional view illustrating the operation of the biasing rubber member in which the distance between the plug and the socket is long.
Figure 8B:
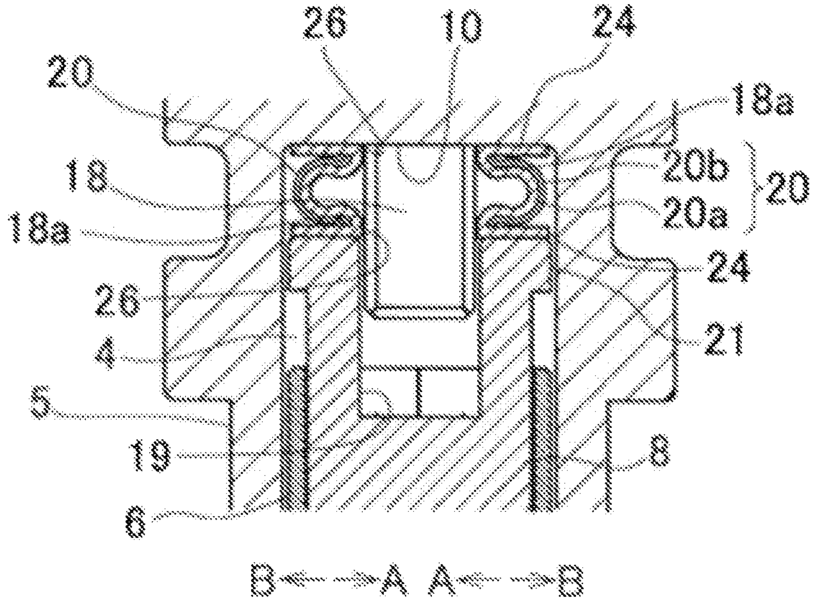
FIG. 8B is an enlarged sectional view illustrating the operation of the biasing rubber member in which the distance between the plug and the socket is short.

The biasing rubber member 9 is designed to be bent in a stable manner, because the guide protrusions 18, 18 are arranged on the side A toward the center of the curvature of each of the elastic pillars 20, 20 . . . and the direction of curvature of each of the elastic pillars 20, 20 . . . is restricted, as illustrated in FIGS. 8A and 8B.

In addition, since each of the elastic pillars 20, 20 . . . has the reinforcing protrusion 20*b* protruding to the outside B of the curvature of the pillar body 20*a*, and the width w1 of the pillar body 20*a* is twice or more the width w2 of the reinforcing protrusion 20*b* in the protruding direction, the biasing rubber member 9 can bias the movable insulator 8 to the side of the socket 3 with a suitable biasing force by obtaining a sufficient reaction force to accompany the bending.

In the above-described embodiment, a case in which the partition 10 of the shell 5 is the object of the reaction force exerted by the biasing rubber member 9 is described, but the reaction force may be exerted on the fixed insulator 13.

The shapes of the shell 5 and the external conductor 6 are not limited to those of the above-described embodiment, and any shape that is conceivable by those skilled in the art can be adopted. For example, a case in which the insulator housing 4 is formed as a square hole is described, but the insulator housing 4 may be formed as a round hole, and accordingly the movable insulator 8 may be formed in a cylindrical shape.

REFERENCE SIGNS LIST

1 coaxial connector with floating mechanism
2 plug
3 socket
4 insulator housing
5 shell
6 external conductor
7 central conductor
8 movable insulator
9 biasing rubber member
10 partition
11 cable connection part
12 insulator insertion hole
13 fixed insulator
14 intermediate rubber member
15 cable-side insulator
16 protrusion
17 flange
18 guide protrusion
19 guide groove
20 elastic pillar
21 flange
22 conductor insertion hole
23 slide hole
24 bearing plate
25 insulator through hole
26 guide recess
27 contact
28 engagement piece
30 socket external conductor
31 socket housing
32 socket contact

The invention claimed is:

1. A coaxial connector, the coaxial connector comprising a plug in which a socket is fitted at one end of the plug, wherein the plug includes:

a shell that is made of a conductive material and has an insulator housing open to the one end;

an outer conductor that is made of a conductive material and is held inside the insulator housing;

a central conductor that is made of a conductive material and is located inside the shell;

a movable insulator that is fitted in the central conductor so as to be slidable and is housed in the insulator housing so as to be movable in an axial direction; and a biasing rubber member that is interposed between a partition disposed in the recesses of the insulator housing and the movable insulator or between a fixed insulator fixed in the shell and the movable insulator, the biasing rubber member including a pair of bearing plates that are opposite to each other with a space in between, and a plurality of elastic pillars that connect between both the bearing plates, and when the socket is connected to the plug, the movable insulator is pushed in by a pushing force from the socket, so that the elastic pillars are bent in an arc shape.

2. The coaxial connector according to claim 1, wherein:

the movable insulator includes, on an outer face, a guide groove into which a guide protrusion protruding to an inner face of the insulator housing is inserted and the movable insulator slides in the insulator housing in an axial direction by being guided by the guide protrusion; and the biasing rubber member includes, along side edges of the bearing plates, guide recesses into which the guide protrusion is inserted, and the elastic pillars are arranged on the side edges of the guide recesses in such a manner that a side toward a center of curvature faces the guide protrusion.

3. The coaxial connector according to claim 1, wherein the elastic pillars each include a plate-shaped pillar body disposed on a side toward a center of curvature, and a reinforcing protrusion protruding outside the pillar body relative to the curvature.

4. The coaxial connector according to claim 3, wherein a width of the pillar body is twice or more a width of the reinforcing protrusion in a protruding direction.

5. The coaxial connector according to claim 1, wherein the movable insulator is formed with a conductor insertion hole into which the central conductor is inserted, and a slide hole which is communicated with the conductor insertion hole and into which the fixed insulator fixed in the shell is inserted so as to be slidable.

* * * * *